US010579491B2

(12) United States Patent
Spiegl et al.

(10) Patent No.: US 10,579,491 B2
(45) Date of Patent: *Mar. 3, 2020

(54) METHOD AND SYSTEM FOR AUTOMATED INJECTION OF PROCESS TYPE SPECIFIC IN PROCESS AGENTS ON PROCESS STARTUP (71) Applicant: Dynatrace LLC, Waltham, MA (US)

(72) Inventors: Helmut Spiegl, Linz (AT); Thomas Koeckerbauer, Mittertreffling (AT)

(73) Assignee: Dynatrace LLC, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,071

(22) Filed: May 10, 2019

(65) Prior Publication Data
US 2019/0266063 A1 Aug. 29, 2019

Related U.S. Application Data (63) Continuation of application No. 15/264,949, filed on Sep. 14, 2016, now Pat. No. 10,289,513.

(60) Provisional application No. 62/218,136, filed on Sep. 14, 2015.

(51) Int. Cl.
G06F 11/30 (2006.01)
(52) U.S. Cl.
CPC ...... *G06F 11/3003* (2013.01); *G06F 11/3093* (2013.01); *G06F 2201/865* (2013.01)

(58) Field of Classification Search
CPC ............ G06F 11/3003; G06F 11/3093; G06F 2201/865
See application file for complete search history.

(56) References Cited

U.S. PATENT DOCUMENTS

| 7,957,934 | B2 | 6/2011 | Greifeneder |
| 8,151,277 | B2 | 4/2012 | Greifeneder et al. |
| 8,234,631 | B2 | 7/2012 | Greifeneder et al. |
| 9,274,919 | B2 | 3/2016 | Greifeneder et al. |
| 2004/0220947 | A1* | 11/2004 | Aman ................. G06F 11/3433 |
| 2012/0304172 | A1* | 11/2012 | Greifeneder ........ G06F 9/45504 718/1 |

* cited by examiner

*Primary Examiner* — Michael A Keller
(74) *Attorney, Agent, or Firm* — Harness, Dickey & Pierce, P.L.C.

(57) ABSTRACT

A system and method is disclosed that installs an agent on a computer system that is configured to be automatically started at startup of the computer system and that is also configured to detect the startup of processes on the computer system. The agent determines the capabilities to monitor process starts that available on the computer systems and installs an appropriate process start monitoring procedure. The installed process start monitoring procedure detects the start of a process, installs a core agent into the execution context of the started process and manipulates the start sequence of the started process to initialize and start the core agent. On startup, the core agent analyzes the execution context of the started process to identify the type of application executed by the started process, and injects a special agent matching the identified type into the started process to perform application level monitoring.

18 Claims, 5 Drawing Sheets

Overview

FIG 1: Overview

METHOD AND SYSTEM FOR AUTOMATED INJECTION OF PROCESS TYPE SPECIFIC IN PROCESS AGENTS ON PROCESS STARTUP

CROSS-REFERENCE TO RELATED APPLICATIONS

This application is a continuation of U.S. application Ser. No. 15/264,949 filed Sep. 14, 2016 which claims the benefit of U.S. Provisional Application No. 62/218,136, filed on Sep. 14, 2015. The entire disclosure of the above application is incorporated herein by reference.

FIELD

The present invention is directed to a system and method for automated injection of in-process agents into processes started on an operating system. More specifically, the disclosed system and method consists in detection of process starts on a monitored operating system, identifying a type of a started process and selecting and injecting a process type specific in-process agent.

BACKGROUND

Application monitoring system directed to the monitoring of transaction execution performance, transaction functionality and resource utilization of application processes typically use in-process agents to gain visibility into process internal data. In-process agents consist in executable code that is injected into the execution context of a monitored process or thread, and is executed together with the original executable code of the process.

As the code of in-process agent runs as part of the monitored process, it has access to process internal transaction execution and resource execution data that is not available from outside the process. The in-process agent typically gathers this data and sends it to an external monitoring server for correlation, analysis, storage and visualization.

The process internal monitoring of application activities provides monitoring data of much higher quality and granularity than external monitoring, e.g. via standard monitoring interfaces either provided by the processes themselves or by the operating system executing them. As a consequence, the usage of in-process agents has gained popularity and monitoring system vendors try to roll out the in-process agent monitoring concept to a wide range of different process types.

However, the injection of an in-process agent requires manual adaptation of the start conditions of processes that should be monitored by an in-process agent. These adaptations may include the manipulation of a command line starting the process, or the setting or changing environment variables or the setting or changing of operating system configuration or registry entries. Different types of processes required different, process specific manipulation of process start conditions to inject an appropriate type of in-process agent into the process. As an example, processes running a Java® virtual machine may require specific manipulations to the command line starting the process to inject a Java specific in-process agent, whereas processes based on the Microsoft .NET® common language runtime may require a specific environment condition specified by the setting of an operating system registry entry to inject a .NET® CLR specific in-process agent. Other types of processes, like processes running Python or PHP script interpreters or processes running a web server may require other modifications of the process start conditions to inject an appropriate in-process agent. Those modifications may e.g. include the manipulation of process initialization configurations data, like data stored in ".ini" files that are read and interpreted by specific processes during startup.

Manual modification of those process start condition on the one hand requires detailed knowledge about the different process type specific mechanisms to inject in process agents and is a highly responsible and also risky task, as incorrectly configured injection conditions may cause a process to either crash either on startup or later or to work incorrectly, on the other hand it also is a monotonous and repetitive task in case of e.g. server farms consisting in large sets of identically configured host computer systems running identically or nearly identically configured processes that all need to be modified manually to inject an in-process agent.

Consequently, a solution is required that reduces the required manual intervention of the start condition of a process to inject an appropriate in-process agent to a minimum.

This section provides background information related to the present disclosure which is not necessarily prior art.

SUMMARY

This section provides a general summary of the disclosure, and is not a comprehensive disclosure of its full scope or all of its features.

The present system and method consists in an operating system agent that is installed on a monitored operating system. On installation of the operating system agent, a mechanism is installed or configured on the monitored operating system that notifies the start of new processes to the operating system agent. On a detected process start, parameters that influence the process start conditions, which may include a process command line, environment variables or operating system registry entries, are adapted to inject a process type independent core agent into the started process. Those adaptations are performed on-the fly, during startup of the process and are not persistently stored. After an uninstallation of the operating system agent, processes would be started without those adaptations that inject a core agent. The core agent is initialized and started early in the startup sequence of the starting process, at a point in time before the starting process is in a condition to execute application specific code.

The operating system agent and the core agent may operate to monitor resource utilizations on operating system level and on process level and may send the monitoring data to a monitoring server operating remotely from the monitored operating system to process, analyze, store and visualize the monitoring data.

In other embodiments, the process type independent core agent may determine the type of process in which it is running, identify a process type specific special agent and inject the process type specific special agent into the starting process. The process type specific special agent may be loaded and initialized early in the startup phase of the monitored process, before the process starts executing application specific code. The process type specific special agent may further monitor the loading of application code, intercept the loading of application code and inject sensor code into the application code to form instrumented code. The instrumented code is executed instead of the originally loaded code and produces tracing data describing individual transaction executions.

Core agent and process type specific special agent may send monitoring and tracing data either to the operating system agent running on the same operating system, which forwards them to the monitoring server, or they may send monitoring and tracing data directly to the monitoring server.

In still other embodiments, the operating system agent may on installation, determine the process startup manipulation capabilities of the monitored operating system and install corresponding process start manipulation functionality. Some operating systems may allow such manipulations on user security level and provide functionalities to inject additional code on process start, while other operating systems may only allow process start manipulations to inject additional code on a kernel security level. The operating system agent may in case of an operating system restricting the injection of additional code on process startup to the kernel security level, install a software component that operates in the kernel security area of the operating system that monitors the start of processes and manipulates the process start conditions to inject and start an in-process agent.

In yet other embodiments, the core agent may access configuration data either provided by the operating system, by the operating system agent or by the monitoring server to determine the appropriate process type specific special agent for a starting process.

In still other embodiments, the core agent may also monitor the file names and version data of the libraries loaded by the process, the version data may be consisting in e.g. file modification dates, library build dates or library version numbers of the loaded libraries. The core agent may report this library data to the operating system agent on each load of a library and the operating system agent may compare version data corresponding with previous and current loading of the library to identify and report changes of used library versions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The disclosed system and method monitors the start of processes performed on an operating system, manipulates the start conditions of a starting process before its actual execution begins in a way that a core agent is injected into the processing environment of the starting process and that the core agent is initialized and started before process specific code is executed. The core agent may on startup, analyze process execution context data, like the name of the process executable, the command line of the process, environment variables or registry entries, to determine the type of process that is started.

Based on the identified process type, the core agent may identify a process type specific agent matching the identified process type and inject the identified process type specific agent into the starting process in a way that the process type specific agent is started before process specific code is executed. On startup, the process type specific agent may load process type specific configuration data that controls the process and transaction monitoring performed by the special agent. The process type specific agent may further analyze process execution context data like a command line to e.g. determine if the starting process runs a specific type of application server, and in response of determine a specific type of application server, load instrumentation configuration data tailored to the code executed by identified application server type.

Figure 1:
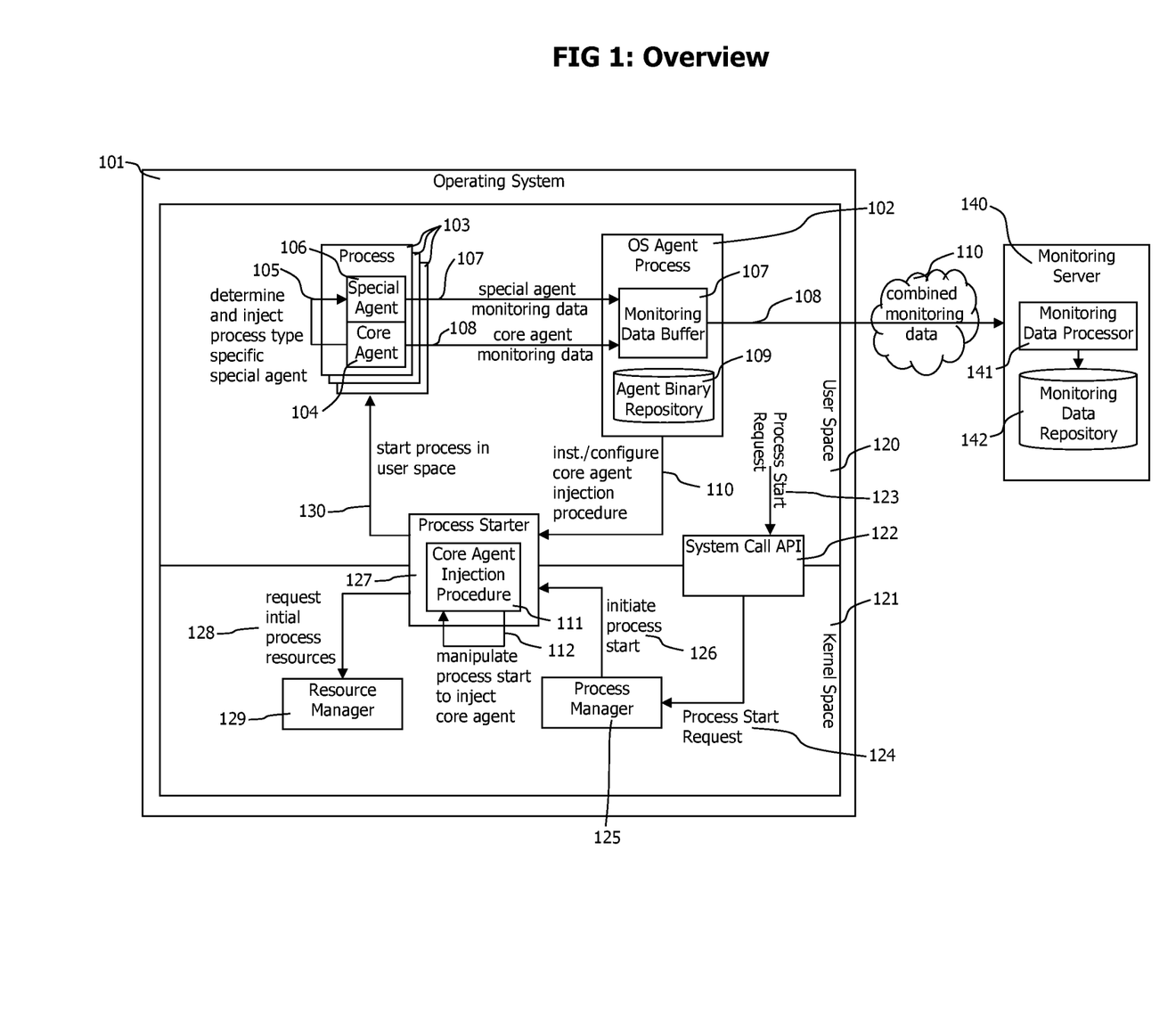
FIG. 1 shows an overview of operating system agent installed and running on a monitored operating system to detect process starts performed on the monitored operating system and to manipulate the detected process starts to inject a process type specific in-process agent into the started processes.

Referring now to FIG. 1 which provides a block diagram of a fraction of a monitoring system consisting in a monitoring server 140, an operating system agent 102 installed on a monitored operating system 101, running as independent process executed in the user space 120 of the monitored operating system and communicating with the monitoring server 140 via a connecting computer network 110. It is noteworthy that the operating system agent may also be implemented as an integral part of the operating system or as an optional extension of the operating system executed in the kernel space of the operating system, similar to a device driver. The operating system agent 102 manipulates the process startup sequence performed by the monitored operating system to start processes in a way that a core agent 104 is injected into each started process. The operating system agent 102 may install 110 a core agent injection procedure 111 that interacts with the process starting functionality 127 of the monitored operating system to detect the start of processes on the operating system and manipulates the start conditions of the starting process to inject and start a core agent into the execution context of the starting process.

Operating systems typically provide an execution environment to run processes executing user code of programs. Code executed in user space 120 may request and interact with resources managed by the operating system, like CPU cores or system memory, in a restricted, operating system controlled way. These restrictions also prevent undesired interferences between different processes, like e.g. one process unintentionally manipulating memory assigned to another process. The management of those resources is performed by operating system code executed in kernel space. Code executed in kernel space 121 is not subject to those restrictions and may directly access resources of the computer system managed by the operating system and may also manipulate the processing environment of user processes. Next to operating system code that manages common resources of a computing system, like CPU cores and system memory and makes it available to user processes, also code allowing the access of specific, not common resources or devices, in form of device drivers, which are optionally installed on the operating system, depending on the available of specific devices or resources, is executed in kernel space.

The monitored operating system 101 may, depending on type and version of the operating system, provide interfaces and configuration utilities that can be accessed with user space privileges, and allow the configuration and installation of a core agent injection procedure 111 by the process running the operating system agent 102 in the user space. As an example, Microsoft Windows® operating systems provide the process execution environment setting "Appinit_DLL" in form of a registry key, which allows to specify dynamically loadable libraries that should be loaded and initialized by starting processes. Linux operating systems, as another example, provide the environment variable "LD_PRELOAD" that allows to specific dynamically loadable libraries that should be loaded by starting processes before loading other libraries required to execute the process. In such operating system environments, the operating system agent may use these user space accessible mechanisms to modify the start of a process to manipulate the process startup sequence in order to implement the core agent injection procedure. The term Linux operating systems or Linux is not meant to restrict the disclosed technologies to Linux variants of UNIX like operating systems. The disclosed technologies may also be applied and used with various other variants of UNIX operating systems.

Some operating system types and versions may not provide such user space process start manipulation mechanisms, or in case they provide it, they may disable those mechanisms due to security reasons. The operating system agent 102 may on installation determine type and version of the operating system on which it is installed, and detect if user space process start manipulation mechanisms are available. In case the operating system does not provide such mechanisms, the operating system agent may install code that is executed in kernel space 121 of the operating system that detects the start of processes on the operating system and then manipulates the process startup to inject and start a core agent. Such kernel space code may be installed in form of a device driver during installation of the operating system agent.

After the operating system agent 102 and the core action injection procedure, either in user space or in kernel space, are installed on the monitored operating system 101, a request to start a new process 123, received by a system call API of the operating system to perform the start of a new process is forwarded 124 to the process manager 125 of the operating system. The process manager keeps track of currently running processes, allows to identify and e.g. terminate individual processes. On receipt of a process start request, the process manager initiates the process start 126, which is executed by the process starter 127. The process initiation is detected and intercepted by the core agent injection procedure 111, which performs a manipulation 112 of the process start request to load and start the core agent on startup of the request. The process start 127 may access a resource manager 129 of the operating system to request initial resources 128 required by the staring process. Afterwards, the process is started 130 in the user space 120 of the operating system. Starting the process triggers the execution of the core agent in the processing context of the starting process.

On startup, the core agent 104 determines 105 the type of the process it is injected to and in case a process type specific special agent for the detected process type is available, it injects the process type specific special agent 106 into the processing context of the started process. A process type specific special agent 106 may provide monitoring and transaction tracing mechanisms matching the monitoring mechanisms available for the type of the starting process. After the core agent 104 and special agent 106 are injected and started within the processing context of the starting process, they may start monitoring the activities performed by the process they are injected to and may report the monitoring data to the monitoring server. The agents may either send 107 and 108 the created monitoring data to the operating system agent running on the operating system executing the monitored process 103 which forwards 108 the monitoring data to the monitoring server, or they may send the monitoring data directly to the monitoring server 140. In some embodiments, the core agent, which is designed to work with all types of processes possible executed on the operating system and thus can only use restricted resources, may send its monitoring data to the operating system agent to avoid network communications. The special agent, which is tailored to a specific type of process and may also use resources and functionality provided by the process type, may directly communicate with the monitoring server 140, as the environment of the process type may allow to operate network communications in a way that they do not affect execution performance of other, process specific code.

The monitoring server 140 receives and processes the received monitoring data in a monitoring data processor 141, and stores the processed monitoring data in a monitoring data repository 142, for further analysis, visualization or other tasks.

Figure 2:
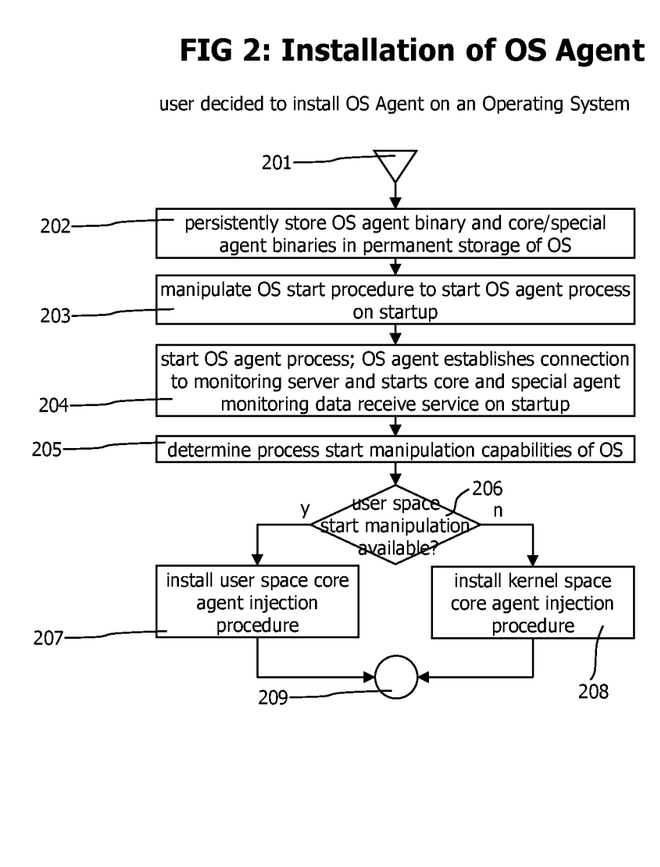
FIG. 2 provides a flowchart describing the installation of an operating system agent on a monitored operating system.

Referring now to FIG. 2, which shows a flowchart that conceptually describes the installation of an operating system agent 102 on an operating system 101. The process starts with step 201, when a user of a monitoring system decides to install an operating system agent 102 on an operating system. Following step 202 persistently and permanently stores the operating system agent executable binary and the binaries for available core and special agent on the operating system, e.g. on a hard disk permanently connected to the computer system executing the operating system. Step 202 may in addition store configuration data used to control injection and operation of core and special agents and which contains data required to connect to the monitoring server 140.

Following step 203 manipulates the start procedure of the operating system on which the operating system agent is installed to automatically start the operating system agent process on start of the operating system. On Microsoft Windows operating system, the operating system agent may e.g. be installed as a service that is configured to be automatically stared on startup of the operating system. On Linux operating systems, a script starting the operating system agent may be added to the "/etc/init.d" folder of the operating system, as those scripts are automatically executed on startup of the operating system. Following step 204 starts the operating system process on the operating system. The operating system agent initiates a connection to the monitoring server 140, and starts listening for monitoring data sent from core or special agents running on the operating system.

Subsequent step 206 analyzes data describing version and configuration of the operating system to determine if it provides user space mechanisms to manipulate the start of processes to inject a core agent. In case such user space mechanisms exist, the process continues with step 207 and configures the user space mechanism to manipulate the start of processes to inject and start the core agent into all subsequently started processes.

To determine if user space mechanisms are available to manipulate the start of processes in a way to load additional libraries on process start, step 206 may first determine the type of operating system on which the operating system agent is going to be installed and then apply operating system specific mechanisms for this determination. For Microsoft Windows operating systems, step 206 may in a first step determine the exact version of the operating system. For some versions of the Windows operating system the user space mechanism to load additional libraries is permanently disabled, if they are operated using specific types of BIOS programs (e.g. UEFI BIOS Programs) that have a feature to enhance the security of the boot sequence of the operating system (secure boot feature). Step 206 may use features of the Windows operating system to determine if this secure boot feature is enabled (e.g. check if registry key "SecureBoot\State" indicates that secure boot is enabled), and in case Windows version and secure boot feature status indicate that the user space mechanism to load additional libraries on startup, notify to use a kernel space core agent injection procedure. In other cases, like on Windows operating systems in which the user space mechanism is available but may be disabled, step 206 may use operating system specific features to check if the user space mechanism is enabled (e.g. check if registry key "LoadAppinit_DLLs" indicates that the "Appinit_DLLs" feature is enabled), and in case the feature is disabled, indicate to use the kernel space core agent injection variant. Other variants of step 206 may enable the user space variant and indicate to use the user space core agent injection variant.

On Linux operating systems, step 206 may be performed by first configuring the user space injection variant, by e.g. first adapting the environment variable "LD_PRELOAD" to in addition load the core agent library on the start of every process, and then simulate the library loading behavior of a starting process, by e.g. executing the command "ldd" to list dynamic dependencies for a specific process executable file. The command "ldd" only loads the libraries required by the process, without executing any process or library code, and provides a report describing all libraries that would be loaded by the process. Step 206 may analyze the provided report to determine if it reports that also the library of the core agent would be loaded by the process. In case the process would load the core agent library, the user space mechanism is working, and the process may in this case for Linux operating systems already end with step 209. In case the report indicates that the core agent library would not be loaded, the step 206 would remove the configuration for the user space injection again and indicate to continue with the installation of the kernel space core agent injection procedure.

In some variants, step 206 may first determine if a kernel space core agent injection procedure is supported by the operating system and only in case the kernel space core agent injection procedure is not supported, indicate to use the user space variant.

The process then ends with step 209. In case step 206 detects that no user space mechanisms to manipulate the start of processes are available on the operating system, the process continues with step 208, which installs a kernel space version of a core agent injection procedure.

The kernel space core agent injection procedure may manipulate the kernel functionality that handles requests to dynamically load libraries into the processing context of processes. The manipulation may insert functionality that is called for each request to load a dynamic library, scan names or meta-data describing the libraries to get loaded to identify the loading of a basic dynamic library that is required and loaded by all or at least all typical process and which is loaded at an early point in time during the startup of the process. For Windows environments, such library would be the dynamically loadable library "nt.dll". On detection of a call to load this library, the kernel space core agent injection procedure may analyze call stack data describing the origin of the call that caused the loading of the basic dynamically loadable library and identify the code fraction causing the loading, determine the point of execution and the code fraction at which loading of the basic library is finished. The kernel space core agent injection procedure may afterwards dynamically inject code that loads and initializes the core agent within the processing context of the staring process.

More specifically, the kernel space core agent injection procedure may register itself for events indicating the starting of processes, the loading of binary images for execution by processes and the starting of threads by processes on kernel space level. The kernel space core agent injection procedure may combine the data provided by those events to detect the start of processes, the loading of a fundamental library (e.g. nt.dll for Microsoft Windows operating systems) by the process that contains functionality required and called during the process startup before any process specific code is loaded. The kernel space core agent injection procedure may further use the data provided by those events to distinguish between loading of libraries by the first or main thread of the process starting on startup of the process and loading of libraries by other threads of the process started by process specific code.

The kernel space core agent injection procedure may on detection of the loading of the fundamental library, analyze the fundamental library to identify a function that is executed on startup of the process before any process specific code is executed. On detection of this function, the kernel space core agent injection procedure may determine the main memory section that contains the code of this function in the memory space of the starting process and change the protection settings of this code section to allow its manipulation. Afterwards, the kernel space core agent injection procedure may manipulate this code section to, after executing the original functionality, execute functionality that loads and initializes the core agent in the execution context of the starting process. After loading and initializing the core agent, the execution of original code is continued.

The kernel space core agent injection procedure may perform the manipulate of this code section in a way that loading and initializing of the core agent is only performed if the code is executed by the first or main thread of the process, but not by other, later created threads of the process. In addition, the kernel space core agent injection procedure may only trigger code manipulation if the fundamental library is loaded by the first or main thread of the process and not perform code manipulation if this fundamental library is again loaded to later start other threads of the process.

The process ends with step 209 after the installation of either a user space or kernel space core agent injection procedure is finished.

Figure 3:
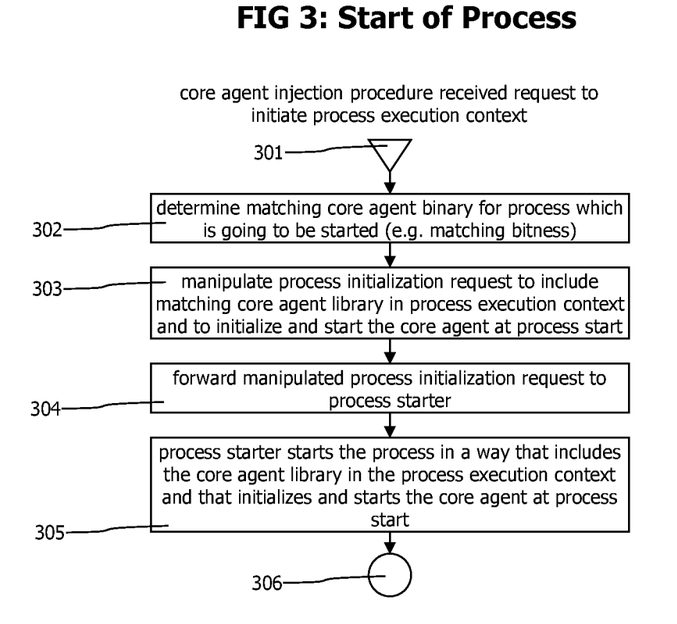
FIG. 3 contains a flowchart describing the manipulation of a process start request to inject a process type independent core agent into starting processes.

Referring now to FIG. 3 which shows a flowchart describing the processing performed by a core agent injection procedure on the start of a user space process on the operating system. The process stars with step 301 when the core agent injection procedure receives a request to start a process and to initialize its process execution context. Following step 302 determines the binary version of the core agent library that is required for the starting process. As an example, operating systems may allow to both run processes compiled to use a 32-bit memory space and processes compiled to use a 64-bit memory space. A core agent injected into a process must support the same bitness (i.e. 16/32/64-bit address space) as the process it is injected to, so for a 32-bit process step 302 may select a version of the core agent library in 32-bit binary format and for 64-bit processes it may select a core agent library in 64-bit format.

Following step 303 manipulates the request to start the process in a way to load the core agent library version selected in step 302 into the processing context of the starting process and to initialize and start the core agent. Loading of the core agent library may either be performed by using user space mechanisms provided by the operating system to specify additional libraries that should dynamically be loaded on start of each process, or in absence of such a user space mechanism, a kernel space library injection procedure installed on the operating system during installation of the operating system agent may be used to load the core agent library.

The initialization of the core agent on startup of the process may be performed by using mechanisms provided by the operating system to initialize dynamically loaded libraries. As an example, on Microsoft Windows operating systems, the procedure that loads a dynamically loadable library into the processing context of a process, searches the loading library for a specific function with the name "Dll-Main", and in case the library provides such a function, this function is called after the library is loaded. The core agent library may provide and use such a function to assure that code that initializes and starts the core agent functionality is executed on loading of the core agent library.

Subsequent step 304 initializes the start of the process in user space, containing the process start conditions manipulated in the previous steps to load and start the core agent during start of the process and following step 305 executes the start of the process, including the loading of a core agent library into the processing context of the staring process and the initialization and start of the core agent functionality provided by the core agent library. The process then ends with step 306.

Figure 4:
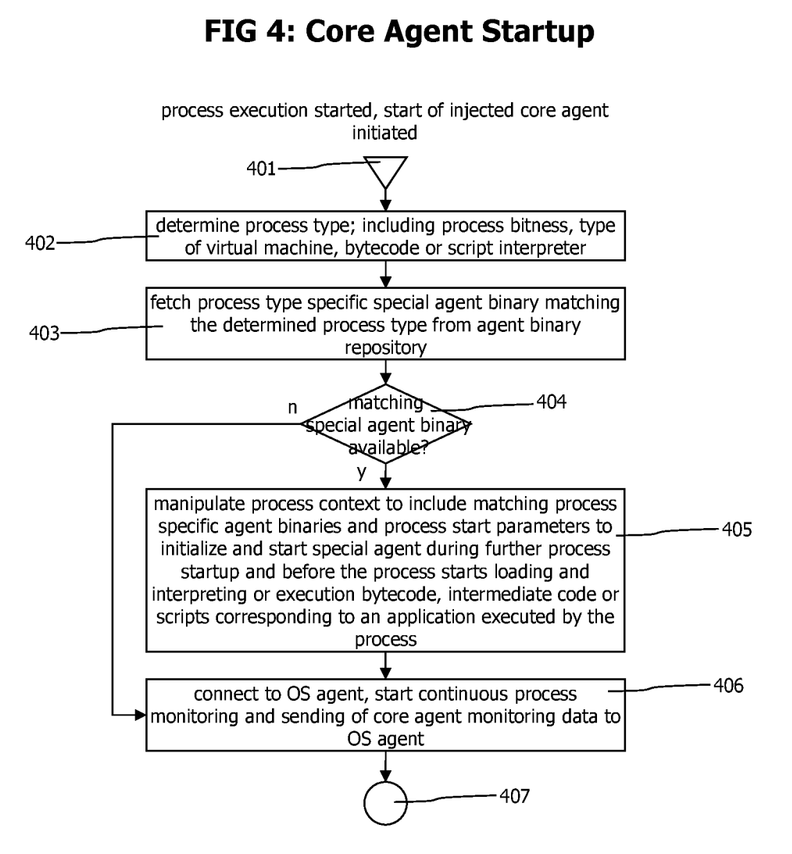
FIG. 4 describes the start of a process type independent core agent within a monitored process to determine and inject and start a process type specific in-process agent.

The processing performed during the startup of the core agent is described in the flowchart shown in FIG. 4. The process starts with step 401 when the execution of a process that is manipulated to load and start a core agent is started and the process start triggers the start of the core agent startup process. Following step 402 determines the type of the process that going to be started, which may include determining a technology platform type used by the process and provided for applications executed by the process and the type of application or application server executed by the starting process on top of the used technology platforms.

The technology platform types detected in step 402 may include but are not limited to bytecode or intermediate code executing technology platforms like an Oracle Java® virtual machine or a Microsoft .NET® Common Language Runtime (.NET CLR), other platform technology to interpret intermediate code or script code, like platforms to execute Ruby, PHP or Python code, technology platforms that provide HTTP Web Server functionality like Microsoft Internet Information Server® (IIS), Nginx, Node.js or Apache web servers or HTTP accelerators like Varnish.

After the technology platform type used by the staring process is detected, the type of application or application server that is executed by the process on top of the technology platform is detected using a technology type specific detection mechanism. As an example, for the Java virtual machine (JVM) platform, data that identifies a class that should be loaded on start of the virtual machine is coded into the command line of the starting process in a Java virtual machine specific way. After step 402 detected that the process is loading a Java virtual machine platform, it may continue to analyze the command line of the process according to the Java virtual machine specific coding rules to determine a start class to e.g. determine a type of application server executed by the virtual machine, as typically each type of application server provides its own start class with a distinctive name. The name of this start class may be used to deduce the application server type.

Various aspects of the execution context of the starting process may be used to detect the technology type platform, which may include but are not limited to the detecting the loading of technology type specific libraries (e.g. "jvm.dll" for the Java or "mscorwks.dll" or "mscoree.dll" for the .NET platform), the name of the process executable binary (e.g. for Ruby, Node.js, Apache, PHP and other platform), or other parts of the command line used to start the process.

To detect loading of type specific libraries, some core agent variants may listen to debugger events sent by the monitored process or the operating system executing the process that indicate the dynamic loading of a library by the monitored process. Those core agent variants may analyze the received debugger events to e.g. extract the name of the loaded library and compare it with library names indicating specific technology platforms. Availability of debugger events may depend on preconditions of the monitored process and the operating system, like an enabled debug mode or the availability of debug-mode code. Those conditions may not always be held.

Other core agent variants may, to detect the loading of specific libraries by a monitored process hook functionality provided by the operating system that may be used to dynamically load libraries. For Microsoft Windows operating systems, this may be the function "LoadLibrary", for Linux operating systems this may be the function "dlopen". Hooking those functions may augment the original code that is executed by those functions with code that notifies the core agent about the name of the loaded library. The core agent may analyze the received names of loaded libraries to detect if they indicate a specific technology platform.

The core agent may use functions provided by the operating system to determine the name of the executable binary of the process into which it is deployed. As an example, Microsoft Windows provides the function "GetModuleFileName" which may be used by the core agent for this purpose. Following step 403 fetches a special agent binary matching the detected technology type platform, e.g. from the agent binary repository 109 of the operating system agent 102. The detected type of application or application server executed on top of the detected technology platform may also be evaluated in step 403 to allow a more specific placement of special agents in starting processes. As an example, the operating system agent 102 may provide configuration data defining that processes running an IBM WebSphere® application server on top of a JVM should be instrumented with a special agent, but processes running an Oracle WebLogic® application server on top of a JVM should not. Technically, a special agent dedicated to the JVM platform is capable to be loaded in both types of process, but considering the type of application or application server running on top of the technology platform allows users of the monitoring system to more specifically control the deployment of special agents into processes. Some variants of the disclosed technology may provide different variants of special agents for different application servers and use the detected application server type to inject the special agent variant matching the detected application server. The configuration data of the operation system agent may also suppress the injection of special agents dedicated to a specific technology platform type, even if the agent binary repository 109 contains special agent binaries for the specific technology platform type.

In case decision step 404 determines that no matching special agent binary is available, either due to configuration or because the binary is not available in the agent binary repository 109 of the operating system agent 102, the process continues with step 406.

If otherwise decision step 404 determines that a special agent binary is available, the process continues with step 405 which manipulates the execution context of the starting process to in addition to the already injected and running core agent 104, inject and start the process type specific special agent 106. Some technology platforms like JVM or .NET CLR platforms may already provide functionality to inject and run a technology specific agent into the processing environment of the process running the platform.

For JVM platforms, the location of binaries and configuration of such a specific agent may be specified via the command line that starts the process. For such platforms, step 405 may manipulate the original command line of the process in a way to include a directive to load and execute the previously determined special agent binaries and to also include configuration parameters required by the special agent. More specifically, the JVM platform provides a function "JNI_CreateJavaVM" that creates and starts a new Java virtual machine environment to execute bytecode. This method has a parameter of type "JavaVMInitArgs" which may be used to specify settings that should be used by the started Java virtual machine environment. Those settings also allow to specify a JVM specific in-process agent that is loaded and used by the starting Java virtual machine environment. The core agent may hook the function "JNI_CreateJavaVM" in a way that calls to this function are redirected to another function provided by the core agent, that receives the parameters for the original call to function "JNI_CreateJavaVM", analyzes those parameters to identify the "JavaVMInitArgs", manipulates the identified "JavaVMInitArgs" to contain settings that cause the loading of a matching process type specific special agent, and then call the original function "JNI_CreateJavaVM" with the manipulated version of the "JavaVMInitArgs".

The analysis of the "JavaVMInitArgs" may also contain a scan for the settings stored in the original "JavaVMInitArgs" for settings specifying other JVM specific in-process agent which may be known to be incompatible with the JVM process type specific special agent of the monitoring system. On detection of such setting parameters indicating the injection of another JVM specific agent, the system may skip the injection of the special agent and issue a warning to the user of the monitoring system indicating that the just started process is not instrumented with a special agent due to another conflicting JVM platform specific agent.

For .NET CLR based platforms, the usage of a platform specific agent may be enabled by specific environment variables (e.g. environment variable "COR_ENABLE_PROFILING"). Binaries and optional configuration data of the specific agent may, in case specific agent usage is enabled be fetched from the platform using a specific registry key (e.g. registry key "COR_PROFILER"). To inject the process type specific special agent in .NET CLR environments, the core agent may detect and intercept calls to fetch values for environment variables to determine if a .NET CLR platform specific agent is enabled, and return a value indicating that it is enabled, and it may detect and intercept calls to fetch values for registry keys to determine binaries and optional configuration data of an platform specific agent, and return values identifying and configuring the process type specific special agent fetched in step 403.

For other, script interpreting platform types, like Ruby or Node.js platforms, the injection and start of the type specific special agent may be performed by scanning the process command line to determine the file name of the script that is initially loaded and interpreted on startup of the script interpreter and by manipulating this script file in a non-permanent (i.e. core agent copies original script, manipulates the copy and manipulates command line to load manipulated copy instead of original script) way to include a script command that loads and executes the special agent. The script command to load the special agent is placed on a position that it is executed before any other command in the script is executed.

For other platform types that allow dynamic loading of modules that is controlled by a platform specific configuration file like e.g. Apache Webserver, PHP, Varnish or IIS platforms, the core agent may scan the processing environment of the starting process (e.g. environment variables, command line) to determine the file name of this configuration file and then manipulate the configuration file in a non-permanent way to load and start a platform specific module containing the special agent.

For platforms that do not provide dynamic module loading capabilities, like the Nginx platform, loading and initializing of the process type specific agent binaries into the process space may directly be triggered by the core agent, and the process type specific special agent may on initialization patch the copy of platform binaries that are loaded into the main memory of the computer system for execution in a way to call special agent functionality on events that should be monitored or traced, like e.g. receiving a HTTP or other request, sending a HTTP or other response, starting or terminating a thread, starting or terminating a method execution or throwing or catching an exception.

After step 405 or after step 404 determined that no special agent should be injected into the starting process, step 406 is executed, which establishes a connection to the operating system agent 102 running on the same operating system 101 as the starting process, and which starts continuously monitoring of the process by the core agent and starts to continuously send the monitoring data to the operating system agent 101.

The process then ends with step 407.

The monitoring performed by the core agent may also include the detection of occurred deployment changes, in form changes of resources loaded by the process, like native or platform specific libraries or modules in cooperation with the operating system agent. The core agent may monitor the resources loaded by the process, determine meta-data describing those resources like file name, file size, file change date or version, and send this meta-data to the operating system agent. The operating system agent may persist this meta-data describing the resources loaded by the process. On subsequent starts of the process, the core agent also sends meta-data describing loaded resources to the operating system agent. The operating system agent compares the new received resource meta-data and compares it with the corresponding persisted version from a previous process start. In case the operating system agent detects deviations between persisted and new received resource meta-data, it may notify a detected deployment change.

Figure 5:
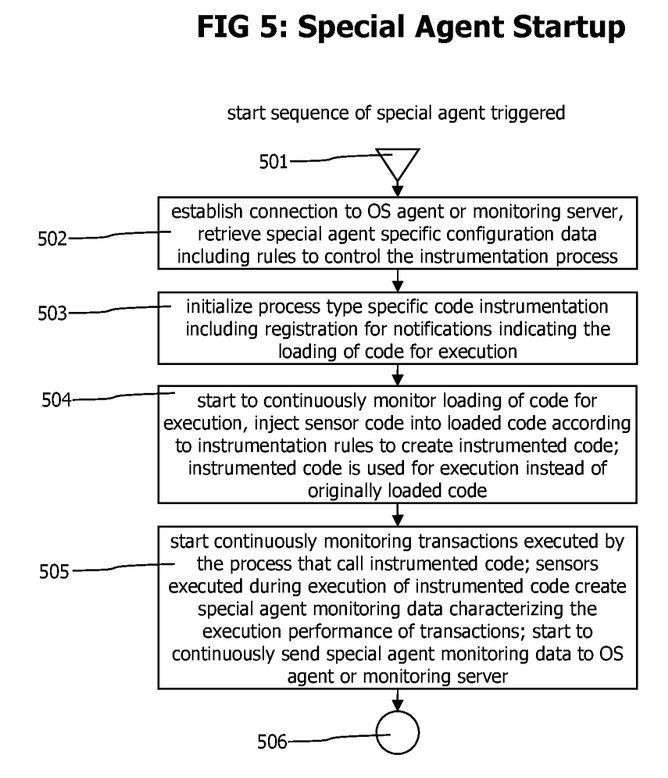
FIG. 5 describes the start of a process type specific in-process agent.

Referring now to FIG. 5, which shows a flowchart describing the startup of a process type specific special agent 106 in the processing context of a starting process.

The process starts with step 501, e.g. after a core agent injected a special agent into the processing context of a starting process and triggered the initialization of the special agent. Following step 502 fetches additional configuration data required by the special agent, like e.g. instrumentation rules to determine portions of code of the application executed by the monitored process, like methods of classes that should be instrumented by the special agent. The special agent may establish a connection to the operating system agent 102 or the monitoring server 140 to download the required configuration data. In case fetching the configuration data from the operating system agent or from the monitoring server fails, the special agent may fall back to use a locally stored version of the configuration data. In case no locally stored version of configuration data is available, the special agent may use a default configuration setting. Following step 503 initializes and starts the process type specific code instrumentation, if the platform technology of the process allows this. This may include registering the special agent to get notified on loading of code for execution.

Subsequent step 504 starts continuous monitoring the loading of new code for execution, determining if the loaded code should be instrumented according to the instrumentation rules, instrumenting the loaded code if instrumentation rules indicate to instrument it by injecting sensor code into the loaded code, and provide the instrumented code to the execution environment of the monitored process. The instrumented code is used for execution instead of the originally loaded code.

Instrumentation of code and monitoring of transaction executions may be performed by special agents according to the teachings of U.S. Pat. No. 7,957,934 "Method and System for Processing Application Performance Data Outside of Monitored Applications to Limit Overhead Caused by Monitoring" by Greifeneder et. al and U.S. Pat. No. 8,234,631 "Method and System for Tracing Individual Transactions at the Granularity Level of Method Calls Throughout Distributed Heterogeneous Applications without Source Code Modifications" by Greifeneder et. al which are all included herein by reference in their entirety. The injection of special agents into starting process may partially be based on the teachings of U.S. Pat. No. 8,151,277 "Method and System for Dynamic Remote Injection of In-Process Agents Into Virtual Machine Based Applications" by Greifeneder et. al, which is included herein in its entirety.

Alternatively, the instrumentation performed by special agents and the configuration of special agents may partially be based on the teachings of U.S. Pat. No. 9,274,919 "TRANSACTION TRACING MECHANISM OF DISTRIBUTED HETEROGENOUS TRANSACTIONS HAVING INSTRUMENTED BYTE CODE WITH CONSTANT MEMORY CONSUMPTION AND INDEPENDENT OF INSTRUMENTED METHOD CALL DEPTH" by Greifeneder et. al, which is included herein in its entirety.

Following step 505 starts continuous monitoring of transactions using the instrumented code and executing the sensor code, creating monitoring data describing the execution of those transactions and sending the monitoring data either to the operating system agent or to the monitoring server.

The process then ends with step 506.

Both core agents and special agents may either communicate with the operating system or with the monitoring server. However, typically, core agents do not directly communicate with the monitoring server as they are injected in all processes and initialized at a very early stage of the process startup, at which relatively less is known about the type and capabilities of the starting process. In this situation it is saver to avoid a relatively resource intensive network communication with a monitoring server running on a remote computer system and use more efficient and less error-prone inter-process communication with the operating system agent.

Special agents are typically executed in the contexts of an application execution platform that brings its own network communication functionality. In this situation it is safer and more reliable to communicate directly with a monitoring server. As an example, the execution environment of the technology platform in which a special agent exists may provide multi-thread capabilities. This would e.g. allow to execute possible time consuming network communication with a monitoring server in a separate thread controlled by the special agent that is executed in parallel to other threads executed by the process and thus decouples the network communication with the monitoring sever from other tasks performed by the monitored process in other threads. The core agent, which is started at a point in time when there is typically no data available to determine a technology platform, may not safely use multi-threading features as the process that is currently going to start may not support multi-threading, and using multi-threading features in a process that does not support multi-threading may cause unexpected behavior.

Generally, the main requirement for core and special agent is to inject and start them in the context of the starting process as early as possible. Core agents should in addition be injected in as much processes started on a monitored operating system as possible. In addition, manipulations of process specific code to inject and initialize a core or special agent in the execution context of a monitored process, is always performed in in a non-persistent way. Only copies of original process specific code that are loaded into main memory for execution are modified, the version of process specific code that is persistently stored on the computer system running the monitored operating system and the monitored processes, e.g. on a hard disk of the computer system, is not manipulated. After e.g. uninstallation of the operating system agent, processes would be started and executed without injection of core or special agents.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for instrumenting monitoring agents into processes executing on an operating system of a computing device, comprising:
   executing an operating system agent as a process in an execution environment of a computing device, wherein the operating system agent is managed by the operating system and the operating system agent is implemented by executable instructions stored in a non-transitory data store associated with the computing device;
   establishing, by the operating system agent, a data connection across a network with a monitor server located remotely from the computing device;
   installing, by the operating system agent, an injection procedure into the execution environment;
   detecting, by the injection procedure, start of a given process in the execution environment, where the given process differs from the process for the operating system agent;
   starting, by the injection procedure, a core agent in the given process, wherein the core agent is started in response to detecting start the given process and the core agent is implemented by executable instructions stored in the non-transitory data store;
   monitoring, by the core agent, execution of an application executed by the given process in the execution environment; and
   sending, by the core agent, performance data describing execution of the application across the network to the monitor server;
   wherein installing an injection procedure further comprises
   determining, by the operating system agent, availability of an install mechanism in a user space of the execution environment;
   installing, by the operating system agent, the injection procedure into the user space in response to a determination that an install mechanism is available in the user space; and
   installing, by the operating system agent, the injection procedure into a kernel space in response to a determination that an install mechanism is unavailable in the user space.

2. The computer-implemented method of claim 1 wherein the injection procedure installed into the kernel space further comprises identifying a generic function executed during start of a process; and inserting code that loads the core agent into the generic function, after the execution of the generic function and prior to the execution of the application by the process; the code that loads the core agent further determines if the generic function is executed during process start in the main thread of the process and suppresses the loading of the core agent if the generic function was executed after the start of the process in other threads of the process.

3. The computer-implemented method of claim 1 further comprises determining, by the core agent, a type for the given process;

retrieving, by the core agent, a process specific agent from a repository residing on the computing device, where the process specific agent is selected from a plurality of process specific agents based on the type for the given process; and starting, by the core agent, the retrieved process specific agent in the given process.

4. The computer-implemented method of claim 3 further comprises monitoring, by the process specific agent, execution of the application executed by the given process in the execution environment; and sending, by the process specific agent, performance data describing execution of the application across the network to the monitor server.

5. The computer-implemented method of claim 1 wherein sending performance data further comprises sending the performance data by the core agent to the operating system agent; receiving the performance data at the operating system agent; and sending the performance data by the operating system agent to the monitor server.

6. The computer-implemented method of claim 1 wherein the performance data is sent by the core agent directly to the monitor server.

7. A computer-implemented method for instrumenting monitoring agents into processes executing on an operating system of a computing device, comprising:

detecting start of a given process in an execution environment of the computing device;

starting a core agent in the given process, wherein the core agent is started in the execution context of the given process and in response to detecting start the given process;

determining, by the core agent, a type for the given process;

retrieving, by the core agent, a process specific agent from a repository residing on the computing device, where the process specific agent is selected from a plurality of process specific agents based on the type for the given process; and starting, by the core agent, the retrieved process specific agent in the execution context of the given process, wherein the core agent and the process specific agent are implemented by executable instructions stored in a non-transitory data store and executed by a processor of the computing device.

8. The computer-implemented method of claim 7 wherein the core agent having access to resources restricted by the operating system and the process specific agent is without access to the resources restricted by the operating system.

9. The computer-implemented method of claim 7 wherein determining type for the given process further comprises determining a type of technology platform used by the given process; and selecting the process specific agent from the plurality of process specific agents according to the type of technology platform.

10. The computer-implemented method of claim 9 further comprises determining a type of technology platform by detecting by the core agent that the given process loads a specific library associated with a particular type of technology platform.

11. The computer-implemented method of claim 9 further comprises determining type of technology platform from name of executable binary for the given process.

12. The computer-implemented method of claim 7 wherein determining type for the given process further comprises determining a type of application server executing the given process and placing the process specific agent into the given process based on the type of application server.

13. The computer-implemented method of claim 7 wherein determining type for the given process further comprises placing the process specific agent into the given process in accordance with a command on a command line that starts the given process.

14. The computer-implemented method of claim 7 wherein determining type for the given process further comprises intercepting call to fetch values from registry keys and placing the process specific agent into the given process in accordance with the intercepted values from the registry keys.

15. The computer-implemented method of claim 7 further comprises monitoring, by the process specific agent, execution of an application executed by the given process in the execution environment; and sending, by the process specific agent, performance data describing execution of the application across the network to the monitor server.

16. The computer-implemented method of claim 15 further comprises executing an operating system agent as a process in the execution environment, wherein the process differs from the given process and the operating system agent is implemented by executable instructions stored in the non-transitory data store and executed by the processor of the computing device;

establishing, by the operating system agent, a data connection across a network with a monitor server located remotely from the computing device;

receiving, by the operating system agent, the performance data from the core agent; and sending, by the operating system agent, the performance data across the network to the monitor server.

17. The computer-implemented method of claim 16 wherein the performance data is sent by the process specific agent directly to the monitor server.

18. A computer-implemented method for instrumenting monitoring agents into processes executing on an operating system of a computing device, comprising:

executing an operating system agent as a process in an execution environment of a computing device, wherein the operating system agent is managed by the operating system and the operating system agent is implemented by executable instructions stored in a non-transitory data store associated with the computing device;

establishing, by the operating system agent, a data connection across a network with a monitor server located remotely from the computing device;

installing, by the operating system agent, an injection procedure into the execution environment;

detecting, by the injection procedure, start of a given process in the execution environment, where the given process differs from the process for the operating system agent;

starting, by the injection procedure, a core agent in the given process, wherein the core agent is started in response to detecting start the given process and the core agent is implemented by executable instructions stored in the non-transitory data store;

monitoring, by the core agent, resources loaded by the given process;

sending, by the core agent, metadata for the resources to operating system agent;

sending, by the operating system agent, a notification across the network to the monitor server, where the notification indicates a change in resources loaded by the given process;

receiving, by the operating system agent, the metadata from the core agent;

comparing, by the operating system agent, the metadata to metadata previously stored by the operating system agent, where the previously stored metadata describes resources previously loaded by the given process; and sending, by the operating system agent, the notification to the monitor server in response to a deviation between the metadata received from the core agent and the previously stored metadata.

* * * * *